(12) United States Patent
White

(10) Patent No.: US 8,043,548 B2
(45) Date of Patent: Oct. 25, 2011

(54) POLYMER MORTAR COMPOSITE PIPE MATERIAL AND MANUFACTURING METHOD

(75) Inventor: David J. White, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 12/657,681

(22) Filed: Jan. 26, 2010

(65) Prior Publication Data

US 2010/0133726 A1 Jun. 3, 2010

Related U.S. Application Data

(62) Division of application No. 11/029,184, filed on Jan. 4, 2005, now abandoned.

(60) Provisional application No. 60/534,440, filed on Jan. 6, 2004.

(51) Int. Cl.
*B29C 43/04* (2006.01)

(52) U.S. Cl. .................................. 264/323; 264/320

(58) Field of Classification Search .................. 264/323, 264/320; 249/152, 153, 127
See application file for complete search history.

(56) References Cited

U.S. PATENT DOCUMENTS

| | | | | |
|---|---|---|---|---|
| 795,518 A * | 7/1905 | Lamp | | 249/139 |
| 1,171,641 A * | 2/1916 | Priest | | 249/112 |
| 2,731,067 A * | 1/1956 | Miller | | 156/190 |
| 3,192,569 A * | 7/1965 | Knabel | | 425/586 |
| 3,647,337 A * | 3/1972 | Dega | | 425/589 |
| 3,991,005 A | 11/1976 | Wallace | | 523/129 |
| 4,153,232 A * | 5/1979 | Burchett | | 249/153 |
| 4,356,281 A | 10/1982 | Brink et al. | | 524/397 |
| 4,621,787 A * | 11/1986 | Westberg | | 249/63 |
| 4,852,630 A * | 8/1989 | Hamajima et al. | | 164/76.1 |
| 5,279,491 A * | 1/1994 | VanAckeren | | 249/141 |
| 5,622,556 A | 4/1997 | Shulman | | 106/677 |
| 6,583,217 B1 | 6/2003 | Li et al. | | 524/650 |
| 6,808,154 B2 * | 10/2004 | Koren | | 249/63 |

FOREIGN PATENT DOCUMENTS

| JP | 5767654 A | 4/1982 |
|---|---|---|
| JP | 2001240732 | 9/2001 |

OTHER PUBLICATIONS

Hackbarth, Composite pipe material from PET and coal combustion, Masters Thesis, Iowa State University, 2002, pp. 1-151.

(Continued)

*Primary Examiner* — Joseph Del Sole
*Assistant Examiner* — Kimberly A Stewart

(57) ABSTRACT

Composite material and plunger-cast pipe manufacturing method and system wherein the composite material includes waste, chemically unmodified PET material, one or more waste filler materials (e.g. rock crusher fines, lime sludge or waste coal combustion by-products), and fiber reinforcement (e.g. glass, metal, ceramic, carbon, organic, and polymer fibers) and wherein the PET material is melted and mixed in a container to disperse filler material and fiber reinforcement in the PET material. The resulting mixture can be formed into a tubular pipe shape using the plunger-cast manufacturing method and system wherein a plunger piston and inner collapsible mold are pushed into the melted composite material contained in an outer mold. When cooled and solidified in the mold, a composite material having a matrix comprising PET with filler material and fiber reinforcement distributed in the matrix is formed in the shape of a tubular body.

5 Claims, 14 Drawing Sheets

OTHER PUBLICATIONS

Rebeiz, et al., Tensile properties of polyester mortar using PET and fly ash wastes, J. Mat. Sci. Letters, 15, 1996, pp. 1273-1275.

Alkan, et al., A study on the production of a new material from fly ash and polyethlene, Published by Elsevier in "Resources Conservation and Recycling," 13, 1995, pp. 147-154.

White, A composite building material from fly ash and recycled polyethylene terephthalate (PET); Abstract submitted to Conference in Las Vagas, Apr. 30, 1998, 2 pages.

Li, et al., Composite material from fly as and post-consumer PET, Published by Elsevier in "Resources, Conservation and Recycling," 24, 1998, pp. 87-93.

White, Microstructure of composite material from high-lime fly ash and RPET, J. of Materials in Civil Eng., Feb. 2000, pp. 60-65.

Steadman, Use of coal ash in recycled plastics and composite materials, University of North Dakota Energy and Environmental Research Center, Overview of Project, Mar. 1994-Mar. 1995.

Rebeiz, et al., Thermal properties of polymer mortar using recycled PET and fly ash, J. of Mat. in Civil Eng., May 1995, pp. 129-133.

Rebeiz, et al., Strength Properties of Polyester Mortar using PET and Fly Ash Wastes, J. of Energy Eng., Apr. 1996, pp. 10-21.

Lewis, Richard J., Sr. (2002). Hawley's Condensed Chemical Dictionary (14th Edition). John Wiley & Sons. Online version available at: www.knovel.com/web/portal/browse/display?_EXT_KNOVEL_DISPLAY_bookid=704&VerticalID=0,"Fly Ash".

* cited by examiner

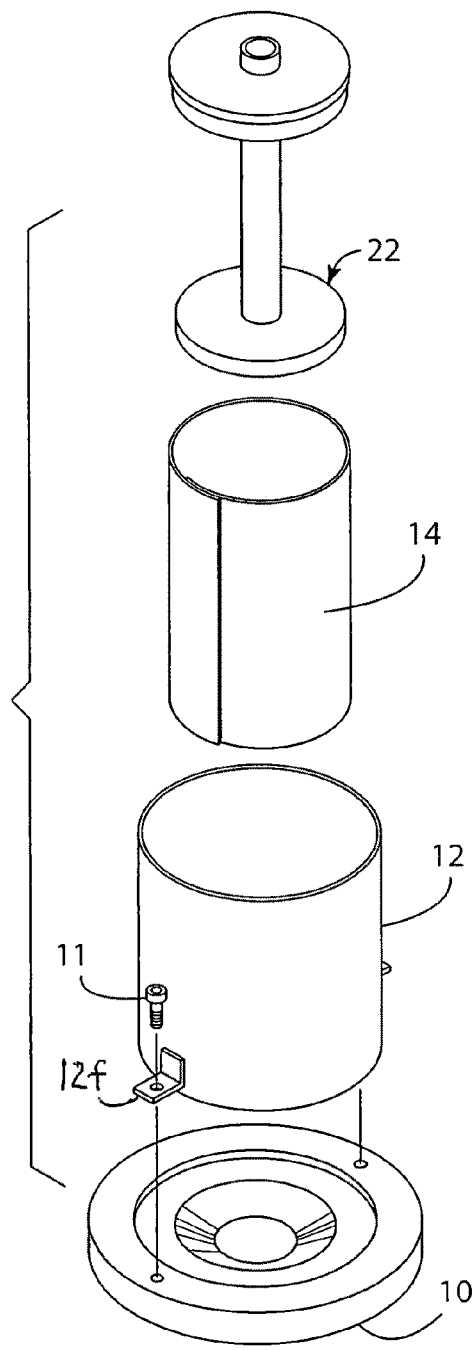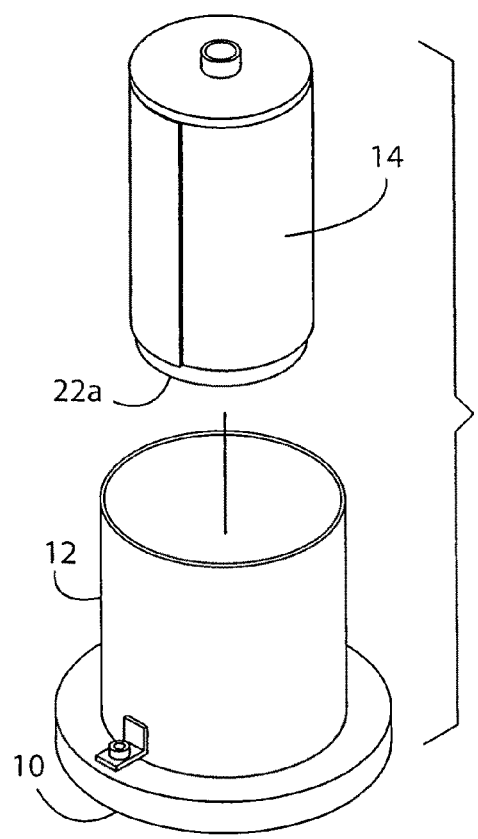

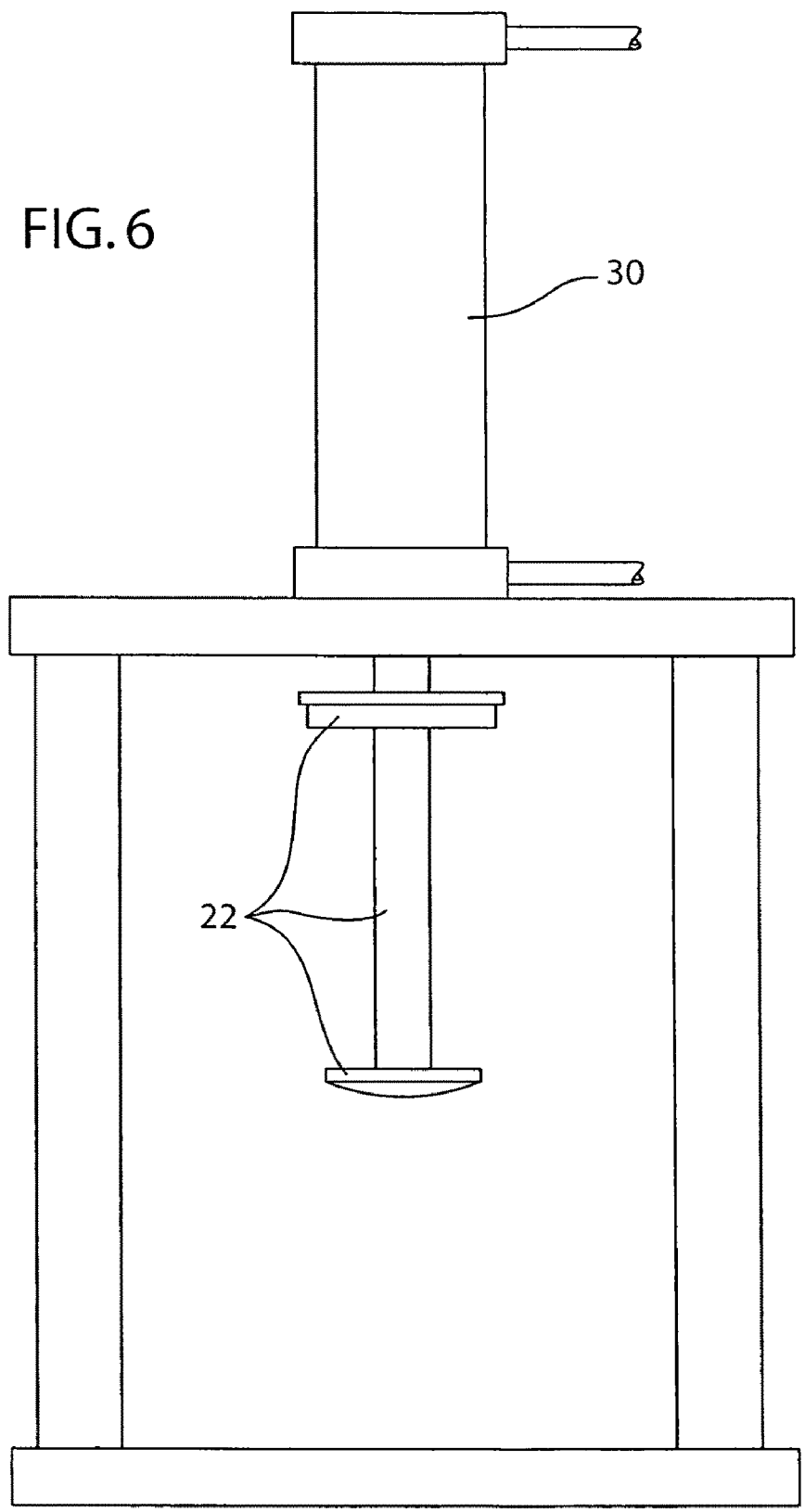

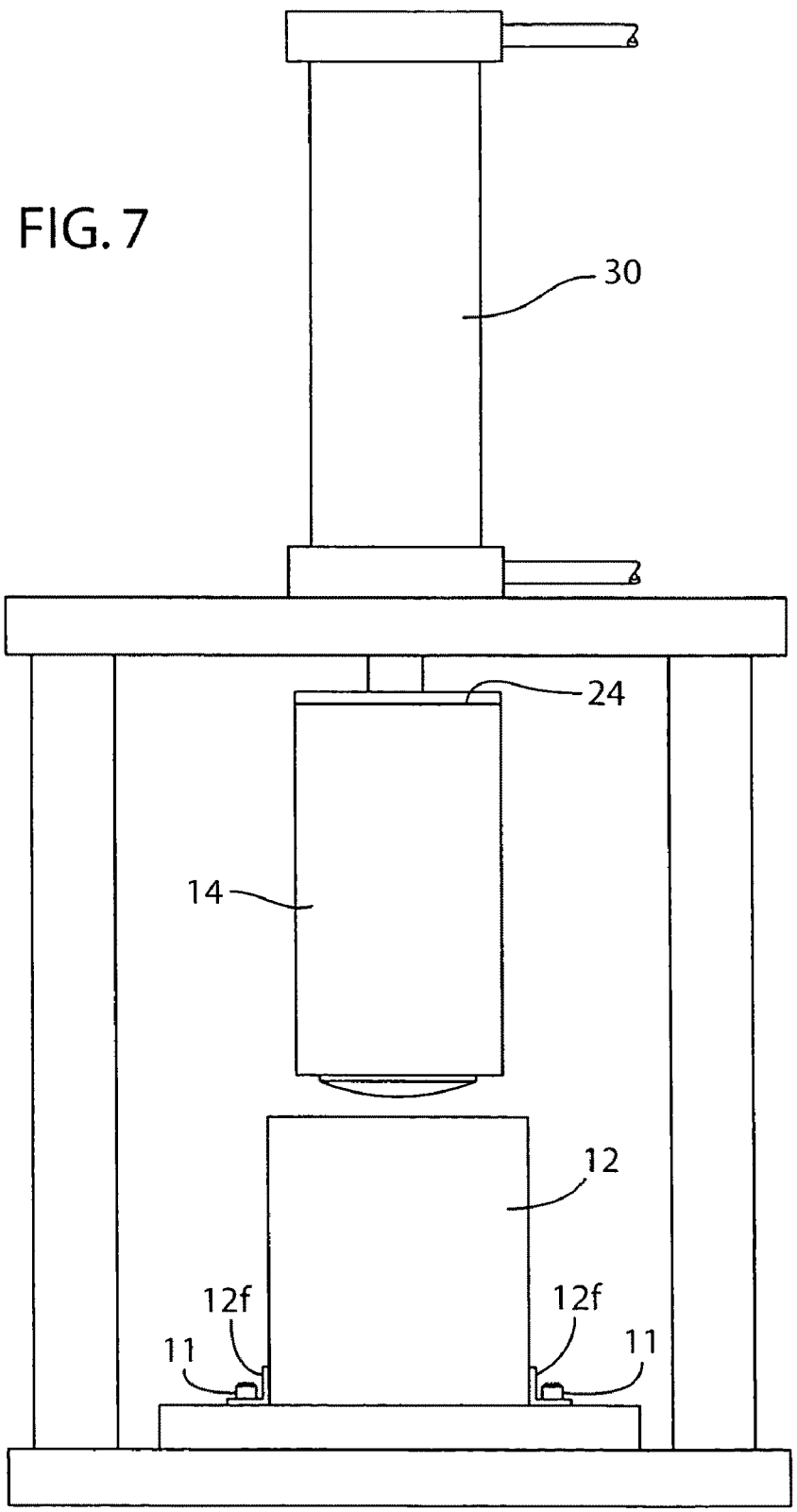

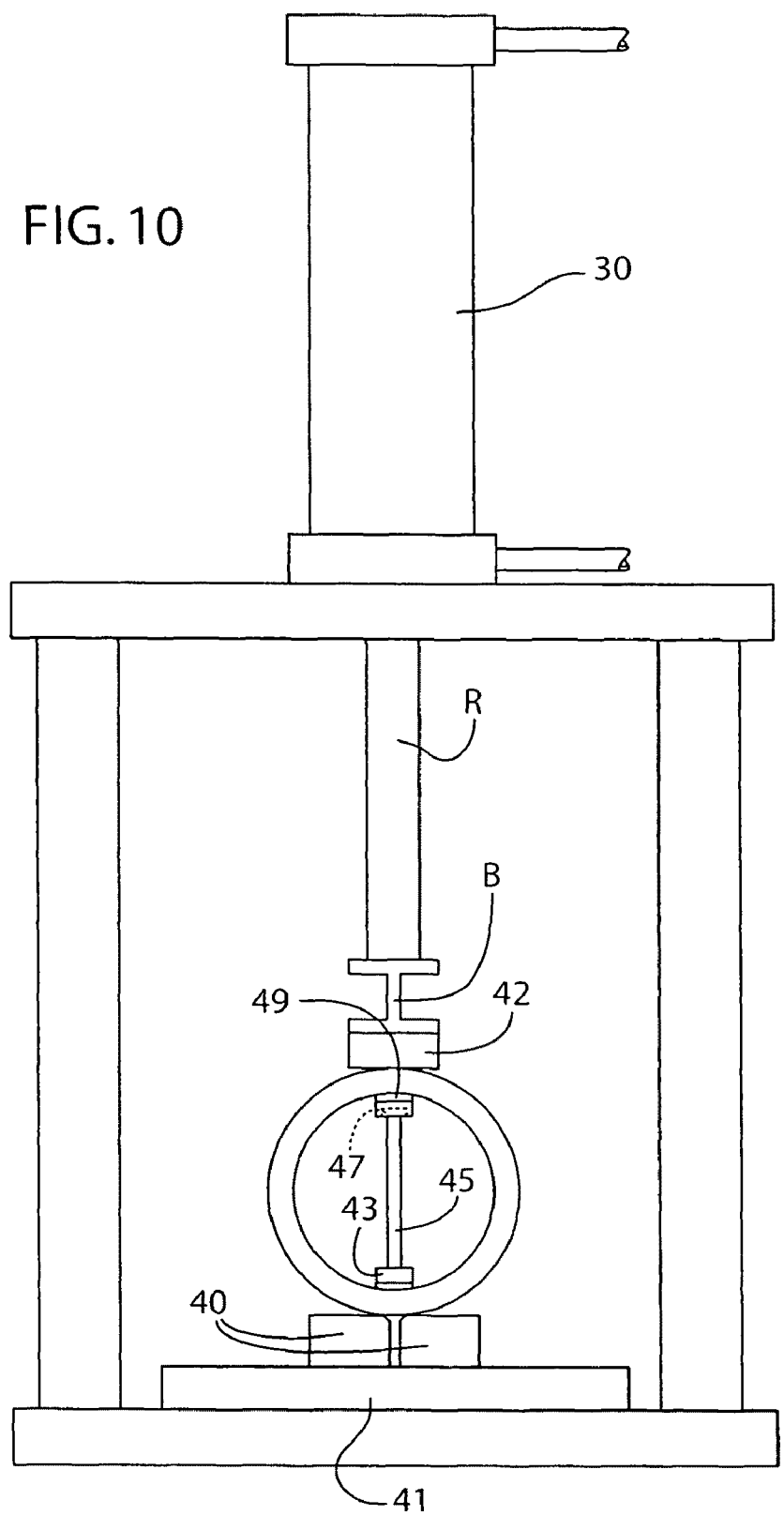

POLYMER MORTAR COMPOSITE PIPE MATERIAL AND MANUFACTURING METHOD

This application is a division of U.S. application Ser. No. 11/029,184 filed Jan. 4, 2005 now abandoned, which claims benefit and priority of U.S. provisional application Ser. No. 60/534,440 filed Jan. 6, 2004.

FIELD OF THE INVENTION

The present invention provides polymer mortar composite materials including recycled, post-consumer waste polyethylene terephthalate (PET) with waste filler materials and fiber reinforcement and methods of their manufacture and methods of their use as pipe in the construction industry.

BACKGROUND OF THE INVENTION

Diverting solid waste from landfills is increasingly important due to limited availability of landfill space, rapidly increasing landfill cost, and environmental threats. The U.S. is the largest global producer of PET containers at nearly 70 percent of the supply [reference 1]. In the U.S., estimates indicate that annual production of PET containers will reach more than 2 million tons [reference 2]. The recycling rate for PET is about 25 percent [reference 3]. Production of the waste filler materials is about 500 million tons for rock quarry crusher fines, 10 million tons of lime sludge, and 100 million tons for coal-combustion by-products. Recycling has emerged as the most practical method to deal with these high-volume waste problems.

In addition, the U.S. has about 19,782 sewerage systems serving about 170 million people or about 75 percent of the population [reference 4]. As with much infrastructure in this country, this subterranean component has also deteriorated due to normal aging, sulfuric acid degradation, under design, poor initial design, and minimal maintenance. It is estimated that 800,000 miles of sanitary sewer line in the U.S. are in need of rehabilitation and that we are currently making repairs at the rate of 2 percent per year [reference 5]. Sixteen thousand miles of rehabilitation with an estimated 8 thousand miles of new construction create a need for improved pipe material.

An object of the invention is to provide a polymer mortar composite pipe material that has several beneficial material properties over conventional Portland cement concrete (PCC) pipe and vitrified extra strength clay tile including high structural capacity, excellent acid resistance, and low density. Equally important is the fact that the material components of the polymer mortar composite formulation consist of recycled plastic and waste filler materials (rock quarry crusher fines, lime sludge or various coal combustion by-products). By using recycled, post-consumer waste polyethylene terephthalate (PET) instead of virgin plastic, which is petroleum derived material; use of a significant volume of crude oil can be reduced.

Another object of the invention is to provide a plunger-cast manufacturing method and system than can increase recycling through production of polymer mortar composite pipe using the composite material mixtures described herein.

Still another benefit of the invention derives from production of the polymer mortar pipe to provide a strong, lightweight, and durable pipe product for which there is currently tremendous need.

SUMMARY OF THE INVENTION

The present invention provides a composite material and plunger-cast pipe manufacturing method and system wherein the composite material comprises waste, chemically unmodified PET material, one or more waste filler materials (e.g. rock crusher fines, lime sludge or waste coal combustion by-products), and fiber reinforcement (e.g. glass, metal, ceramic, carbon, organic, and polymer fibers). The PET material is melted and mixed with the other constituents in a container to disperse the waste filler material and the reinforcement fibers in the PET material. The resulting mixture can be formed into a tubular pipe shape using the plunger-cast manufacturing method and system pursuant to an embodiment of the invention wherein a piston and an inner collapsible mold thereon are pushed into the melted composite material contained in an outer mold. When cooled and solidified in the mold, a composite material having a matrix comprising PET with filler material and fiber reinforcement distributed in the matrix is formed in the shape of a tubular body. The plunger-cast pipe manufacturing method and system can be used with other materials as well and is not limited to the composite material described above.

In one embodiment of the invention, the solid waste, chemically unmodified PET material, waste filler particles and fiber reinforcement are premixed and placed in a melting container for melting of the PET material while the mixture is mixed or stirred. Alternately, the solid waste, chemically unmodified PET material can be melted in the container, and pre-heated waste filler particles introduced to the melted PET material with the mixture stirred or mixed. Once the PET/filler mixture is homogenized, the fiber reinforcement is incrementally added to the mixture and stirred or mixed. The mixture of melted PET material, waste filler particles and fiber reinforcement can be molded, extruded or otherwise formed.

The invention envisions use of waste PET material from recycled beverage bottles and other sources. In practice of the invention, the recycled waste PET material is not chemically modified in any way prior to melting. The solid recycled waste PET material may be washed in tap water and shredded or otherwise comminuted prior to melting.

The invention envisions use of different types of one or more waste filler materials including rock quarry crusher fines, lime sludge and/or coal-combustion byproducts and/or other waste filler materials with comparable morphological characteristics.

Various amounts of filler material up to about 70 percent (based on weight of PET) in combination with various amounts of fiber reinforcement up to about 6 percent (based on weight of PET and waste filler) can be included in the composite material. Preferably, the waste filler content of the composite material is at least about 50 percent and fiber content preferably from about 1 to about 4 percent.

In another illustrative embodiment of the invention, the melted and mixed composite material (or other flowable material) is formed into a tubular pipe using a plunger-cast manufacturing method and system. In practice of an illustrative method embodiment of the invention, a piston plunger, base plate, outer rigid cylinder mold, and inner collapsible mold are first preheated in an oven to about 270° C. The plunger piston preferably is a specially shaped, beveled plunger piston attached to a hydraulic piston. The inner collapsible mold is attached to the plunger piston. The base plate and outer rigid mold are placed under the piston and the melted composite material is introduced into the outer rigid mold and base plate. The inner mold includes a transverse dimension, such as diameter, that is smaller than that of the outer mold so as to form a space therebetween when the inner mold is positioned in the outer mold. The plunger piston with the inner collapsible mold thereon are hydraulically pushed down into the melted composite material, thus forcing the melted composite material outward into the space between the inner and outer molds to form a tubular pipe shape. After the inner mold is fully positioned or inserted into the outer mold, the plunger piston is removed leaving the inner collapsible mold in place forming the inner wall of the pipe. During curing of the composite material, the inner mold can collapse, thus allowing for thermodynamic shrinkage of the composite material. Fiber reinforcement significantly reduces deleterious shrinkage cracks from forming during the cooling process. Once the pipe has cooled enough to solidify, it is removed from the mold and further cooled at room temperature. The plunger-cast manufacturing method and system is then reused to manufacture additional tubular pipe sections.

The above objects and advantages of the invention will become more readily apparent from the following detailed description taken with the following drawings.

DETAILED DESCRIPTION OF THE DRAWINGS

FIGS. 1A, 1B, and 1C are photographs of three forms of solid waste, post-consumer recycled PET beverage bottle material.

FIGS. 2A, 2B are photomicrographs of fiber reinforcement with waste filler material (rock quarry crusher fines designated RCF) and FIG. 2C is a photomicrograph of the particle distributions of the waste filler material (RCF).

FIG. 3A is a side elevation of the plunger piston. FIG. 3B is a side elevation of the collapsible inner mold. FIG. 3C is a plan view of the inner mold. FIG. 3D is a perspective view of the piston. FIG. 3E is a schematic perspective view showing the inner collapsible mold. FIG. 3F is a schematic partial enlarged perspective view of the inner collapsible mold edges overlapped and encircled in FIG. 3E.

FIG. 4A is a schematic elevational view of outer rigid mold. FIG. 4B is a schematic elevational view of the bottom plate on which the outer mold sits. FIG. 4C is a plan view of the bottom plate. FIG. 4D is a perspective view of the outer mold. FIG. 4E is a perspective of the bottom plate.

FIG. 5A is an exploded schematic view of components of the plunger-cast manufacturing system. FIG. 5B is an exploded schematic view of the plunger piston having the inner mold thereon and the outer rigid mold located below the assembled plunger piston and inner collapsible mold.

FIG. 6 is a side elevation of the plunger piston connected to hydraulic ram

FIG. 7 is a side elevation of the inner collapsible mold attached to plunger piston and base plate with outer mold FIG. 10 is a perspective view of the ultimate three-edge bearing test setup.

DETAILED DESCRIPTION OF THE INVENTION

The present invention will be described first with respect to making a composite material using solid waste, post-consumer recycled PET material and waster filler materials and discontinuous reinforcement fibers. Next the engineering properties of the composite material will be described, and finally the plunger-cast manufacturing process and ultimate three-edge bearing strength tests for pipe specimens will be presented, all for purposes of illustration and not limitation.

Post-Consumer Recycled PET

Figure 1A:
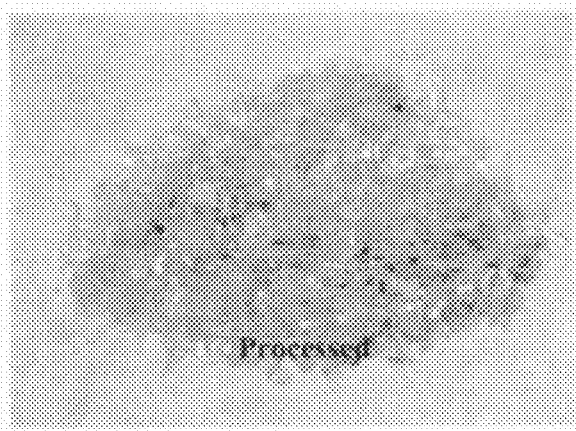
Figure 1B:
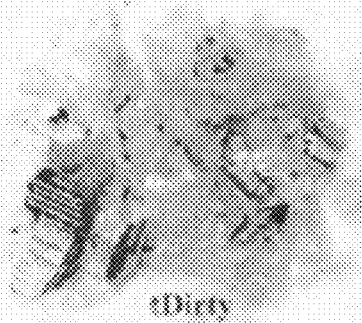
Figure 1C:
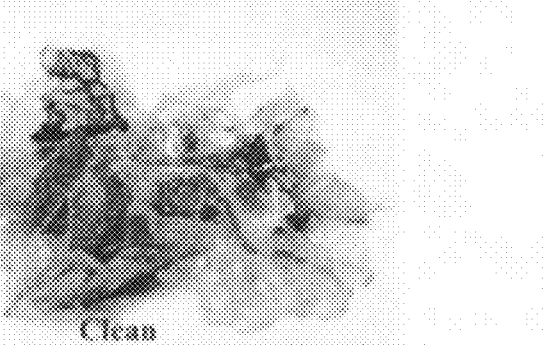

Solid waste, post-consumer recycled PET beverage bottle materials are used as the binder material in the composite material and are available in three forms: (Type 1) sorted, washed and processed; (Type 2) unsorted and shredded; and (Type 3) partially-sorted, shredded and washed. Flaked or pelletized PET commonly available from plastic recycled facilities is referred to as "Type 1". PET collected in the form of waste beverage containers that have been shredded without removing the labels or caps and no washing is referred to as "Type 2". PET collected in the form of waste beverage containers that have been shredded after removing some of the labels and caps and washing in a water bath is referred to as "Type 3". FIGS. 1A, 1B, and 1C show the three forms Type 1, Type 2, Type 3, respectively, of post-consumer recycled PET beverage bottle material used in the production of composite material pursuant to an illustrative embodiment of the invention offered for purposes of illustration and not limitation.

Waste Filler Materials

Several types of waste filler materials can be used in the composite material mixture including: (1) rock quarry crusher fines (RCF); (2) coal-combustion by-products (CCBs); and (3) lime sludge from water treatment plants (LS). Table 1 summarizes the chemical constituents and physical properties for all waste filler materials used in examples described below.

Rock Quarry Crusher Fines

Of the 2-billion tons of aggregate produced per year in the U.S. [reference 6], it is estimated that an additional 25 percent to 30 percent is wasted due to crushing and screening operations. The screening materials (typically 100 percent passing 9.5 mm sieve and up to about 30 percent passing the 0.075 mm sieve) are often stockpiled or put back into the quarry as fill, resulting in zero or negative value. The rock quarry crusher fines used in the examples below comprised crushed quartzite. 100 percent of the particles were smaller than 0.15 mm and 74 percent smaller than 0.075 mm. Minerals identified in the rock quarry crusher fines consisted of quartz, kaolinite, and talc.

Lime Sludge

Most drinking water is softened and most commonly lime softening is used, introducing slaked lime to remove hardness as calcium carbonate and magnesium hydroxide. About 10 million tons of lime sludge is generated in the U.S. annually, which creates disposal problems. Lime sludge has very similar chemical composition as limestone. 100 percent of the lime sludge used in the examples below was smaller than 0.075 mm. The only mineral identified in the lime was calcite.

Coal Combustion By-Products

Coal combustion by-products are produced from burning coal in energy production facilities and exist in a wide range of gradations and chemical compositions. About 100 million tons of coal combustion by-products are produced in the U.S. annually [reference 7]. Six different coal combustion by-products were evaluated in this study including: (1) Prairie Creek fly ash (PFA); (2) Ames fly ash (AFA); (3) Iowa State University (ISU) circulating fluidized bed fly ash (CFBFA); (4) ISU stoker fly ash (SFA); (5) ISU circulating fluidized bed bottom ash (CFBBA); (6) ISU stoker bottom ash (SBA); and (6) University of Northern Iowa (UNI) fluidized bed combustion residue (FBC).

PFA is produced form burning coal originating from the Powder River Basin in Wyoming and is burned in pulverized boilers. All particles are smaller than 0.85 mm and 93 percent are smaller than 0.075 mm. PFA classifies as an ASTM C618 class C fly ash. AFA is also produced from burning Powder River Basin coal in pulverized boilers. About 10 percent by weight of municipal solid waste is also burned with AFA coal. All particles are smaller than 0.85 mm and 95 percent are smaller than 0.075 mm. This material cannot be classified as ASTM class C fly ash since municipal solid waste is burned with the coal. Minerals identified in the ash are quartz, anhydrite, brownmillerite, lime, periclase, and tricalcium aluminate.

CFBFA and SFA were both supplied by ISU Power Plant, which burns a mixture of coal from Illinois and Kentucky. The same mixture of coal is burned in two different types of boilers. The ashes receive their names from the boilers in which they are produced, circulating fluidized bed and stoker boilers, respectively. SFA has the highest loss on ignition (LOI) at 42.4 percent due to inefficient combustion. All CFBFA particles are smaller than 0.25 mm and 89 percent are smaller than 0.075 mm. All particles in SFA are smaller than 2.00 mm and 93 percent are smaller than 0.075 mm. Minerals identified in the CFBFA are quartz, anhydrite, lime, hematite, and illite. Minerals identified in the SFA are quartz, mullite, hematite, and albite.

CFBBA material has particles with 99 percent smaller than 4.75 mm and only 1 percent smaller than 0.075 mm. Quartz, anhydrite, lime, hematite, calcite, and portlandite are the minerals identified in the CFBBA.

Due to large particle sizes, SBA was first crushed so that all particles are smaller than 2.0 mm and 28 percent are smaller than 0.075 mm. Quartz, mullite, Magnetite, and hematite are the minerals identified in the SBA.

FBC was supplied by the UNI Power Plant, which burns a mixture of coal from Kentucky and West Virginia. A pyropower boiler is used to burn the coal at this location. All particles are smaller than 2.0 mm and 64 percent are smaller than 0.075 mm. Minerals identified in the FBC are lime, anhydrite, quartz, and hematite.

Fiber Reinforcement

Fiber reinforcement is added to the composite material to improve its engineering properties and control thermodynamic shrinkage. Fiber reinforcement can include one or more of glass, metal, ceramic, carbon, organic, and polymer fibers. For the examples described below, discontinuous fiberglass fibers of different lengths (6 mm and 13 mm) were used. The fibers were both chopped strand 919-4 CT fiberglass fibers produced by Vetrotex America, Inc. (Product Nos. CA4J919022 and CA4J919053, respectively). Fiber reinforcement is an essential component of the composite material for production of the plunger-cast tubular pipe specimens, as without fibers, thermodynamic shrinkage cracks develop during the cooling process. Further, the fiber reinforcement enhances uniform distribution of air voids.

Manufacturing Process for Composite Material

Manufacturing of the composite material is initialed by weighting out the desired post-consumer PET material (Type 1, 2 or 3), the waste filler material, and fiber reinforcement. The post-consumer PET is introduced into an electric melting pot and then pre-heated waste filler material is added and mixed with the melted PET. The post-consumer PET, which is a thermoplastic, melts at about 270° C. The filler material can alternately be added to the melted PET prior to heating. A mechanical stirring device (steel rod or spatula) is used to mix the PET and waste filler materials. Once mixed, the fiber reinforcement is incrementally added and mixed until evenly dispersed in the mixture.

Specimens for engineering property evaluation are prepared by transferring the composite mixture into preheated mold of the desired geometry and allowing the mixture to cool at room temperature.

Engineering Properties of Composite Material Mixtures

Table 2 summarizes engineering properties including density, compressive strength, tensile strength, and elastic modulus of the composite mixture. Statistical analyses show that the compressive strength, tensile strength and elastic modulus increase with increased filler content and fiber content.

Compressive Strength

ASTM C 39/C 39M-99 Standard Test Method for Compressive Strength of Cylindrical Concrete Specimens [reference 8] was used as a guide to test the compressive strength for the composite cylinder specimens. A Soiltest machine was used to produce the compressive force. The smallest division on the testing machine was 0.2 kN. Loading rate was calculated by measuring the elapsed time for increment 2 kN. The load of 2 kN was then divided by the initial cross-sectional area to determine the compressive strength. Compressive strength was then divided by the elapsed time in seconds to determine the loading rate.

Test specimens were constructed from different composite mixtures. Two cylinder specimens from every composite design mix were tested. Test specimens had a diameter of about 50.8 mm and a length of 101.6 mm. Load rate was continuous and without shock and within the range of 0.15 to 0.35 MPa/s. The diameter of the cylinder specimens was determined by averaging two diameters in the middle of the specimen at right angles from each other. Lengths of the cylinder specimens were determined by averaging two lengths.

Cylinder specimens were positioned by centering them vertically on one of their ends in the middle of the bearing block. The ram was then lowered so that it came into contact with the top end of the cylinder specimen. The testing machine was set to controlled test, which started the loading. Loading continued until the load indicator decreased significantly. This decrease indicated that the cylinder specimen failed. The maximum load was then recorded to the nearest 0.2 kN division. The testing machine was then unloaded and the sample removed. This process continued until all of the cylinder specimens were tested.

Results indicate that the average compressive strength for 96 specimens is 38.8 MPa, which is slightly greater than the ordinary PCC strength of 15 to 35 MPa. Elastic modulus varied from 1300 MPa to 5700 MPa. The average elastic modulus was 3300 MPa (24 specimens), which is 7 to 10 times lower than ordinary PCC. Density of the composite ranged from 1.2 to 1.8 g/cm$^3$ with an average of 1.6 g/cm$^3$, which is lower than ordinary PCC densities of 1.9 to 2.5 g/cm$^3$. Statistical analyses show that compressive strength, elastic modulus and density increase with increased filler and fiber reinforcement content.

Tensile Strength

ASTM C 496-96 Standard Test Method for Splitting Tensile Strength of Cylindrical Concrete Specimens [reference 9] was used as a guide to test the tensile strength for the composite cylinder specimens. A Soiltest machine was used to produce the compressive force.

Bearing strips were constructed from 6.4 mm thick oak plywood. Widths of the plywood bearing strips were 25 mm and the lengths were 114.3 mm. Supplementary bearing bar was constructed from a 12.7 mm thick aluminum bar. Aluminum bar had a width of 38 mm and the length of the bar was 114.3 mm. Test specimens were constructed from different composite mixtures and had diameters of 50.8 mm and lengths of 101.6 mm. 152 mm diameter steel spacer blocks were used as the lower bearing platform.

Loading rate was constant and within the range of 689 to 1380 kPa/min. A centerline was drawn on one end of the cylinder specimens and the diameter of the cylinder specimens was determined by averaging three diameters along the centerline. Three diameter measurements were taken, 25 mm from each end and one in the middle of the cylinder specimens. Lengths of the cylinder specimens were determined by averaging two lengths.

Cylinder specimens were positioned by centering one plywood strip on the lower bearing platform lengthwise and placing the cylinder specimen lengthwise so that the centerline was vertically over the center of the width of the plywood strip. Then the top plywood strip was placed over the cylinder specimen lengthwise and centered over the centerline. The upper bearing bar was then centered over the top plywood strip. The ram was lowered so that it came in contacted with the upper bearing bar. The cylinder specimen, plywood strips, and upper bearing bar were then aligned and centered.

The testing machine was then set to controlled test, which started the loading. Loading continued until the load indicator decreased significantly. This decrease indicated that the cylinder specimen failed. Maximum load was then recorded to the nearest 0.2 kN division. The testing machine was unloaded and the sample removed. Plywood strips were then disposed. This process continued until all of the cylinder specimens were tested.

Results indicate that the average splitting tensile strengths for 96 specimens is 4.3 MPa, which is greater than the ordinary PCC strength of 1.5 to 3.5 MPa. Further, statistical analyses indicate that tensile strength increases with increased filler content and fiber reinforcement content.

Durability Testing

Two durability tests were conducted to evaluate the composite mixtures under various environmental conditions similar to which sewer pipes are subjected—water absorption and sulfuric acid resistance. Specimens for the water absorption and acid resistance tests were made by cutting discs off of cylinder specimens.

Water absorption tests were conducted to indicate the amount of water the various composite mixtures absorbed. ASTM D 570-98 Standard Test Method for Water Absorption of Plastics [reference 10] was used as a guide to test the water absorption of the composite specimens. 50.8 mm diameter specimen discs were cut off of the cylinders using a power miter saw with a masonry blade to a thickness of 6 mm.

One disc for each composite mixture was tested for water absorption. Discs were placed in the same container of tap water. The disc's weight, thickness, and two diameters at a right angle from each other were measured prior to submerging them into the water. Discs were placed into the water so a section of one part of the circumference touched the side of the container and another section of the same edge touched the bottom of the water container. The specimen discs were then left alone for a period of one week at room temperature. After one week, discs were removed from the water one at a time. Surfaces of the specimen discs were then dried with a cotton cloth rag. Their weights were recorded to the nearest 0.01 g and then the discs were immediately placed back into the water container. The water absorption test was conducted after the first week and every two weeks thereafter for a period of seven weeks.

Results are presented in Table 3. The Δ symbol is the percent difference in water absorption between composites with filler and pure plastic. Positive numbers indicated that the composites with filler absorbed more water than the pure plastic. All specimens with sulfur trioxide contents higher than 12% had high water absorption. Specimens with CFBBA, which has a sulfur trioxide content of 30.7%, exhibited water absorption of approximately 12%. The RCF material absorbed the least water.

Sulfuric acid, which can be produced from bacteria in sewage, is responsible for destroying PCC sewer pipes. For this reason, the composite mixtures were tested in a 10 percent by volume sulfuric acid and water solution. ASTM D 543-95 Standard Practices for Evaluating the Resistance of Plastics to Chemical Reagents [reference 11] was used as a guide for this procedure. Specimen discs weights, thicknesses at the center, and two diameters at right angles to each other were measured prior to introducing them into the acid. Dimensions were measured to at least 0.025 mm and the weights were measured to the nearest 0.01 grams.

Sulfuric acid was placed into Mason canning jars and the discs were then submerged into the acid. Each disc was placed in a separate jar. After placing the discs into jars, the lids were screwed on and the jars were left alone at room temperature for a period of one week. After one week, the lids of the jars were removed and specimens were taken out of the jar using tongs. Specimens were rinsed under running tap water to remove the sulfuric acid. Then, the surfaces of the specimen were wiped dry using a cotton cloth rag. The weight, thickness, and diameters of the specimen were then recorded. The specimen was placed back into the jar and the lid screwed down. Observations were recorded on the appearance of the specimen. These procedures were followed again at two week intervals for a period of seven weeks.

Summary of the results for the acid resistance tests are provided in Table 4. The positive numbers indicate specimens absorbed sulfuric acid solution. The RCF and pure PET plastic specimens showed the greatest resistance to a solution of 10% sulfuric acid in these accelerated laboratory tests.

Microstructure Analysis

Figure 2A:
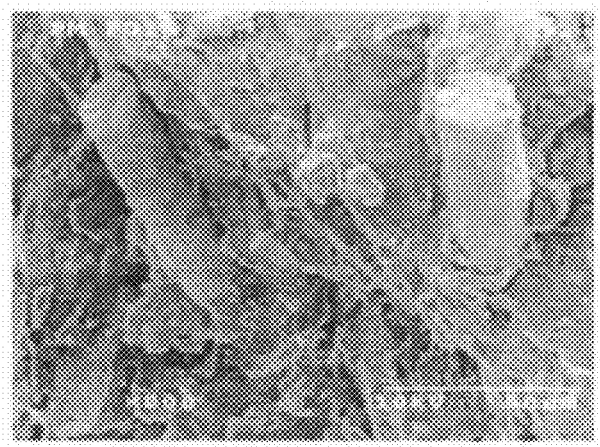
Figure 2B:
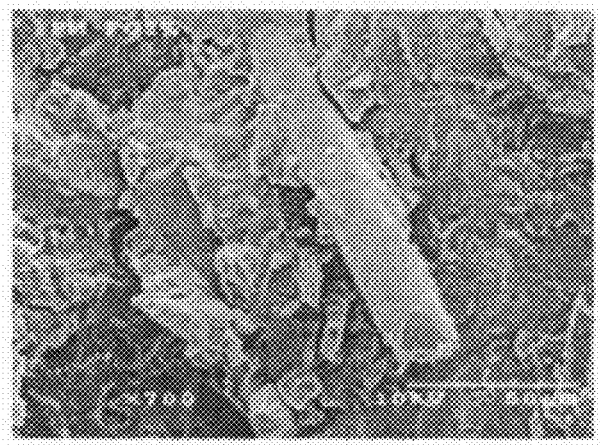
Figure 2C:
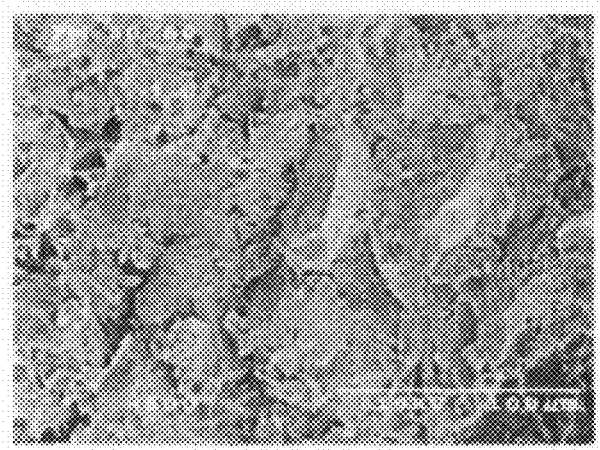
Figure 3A:
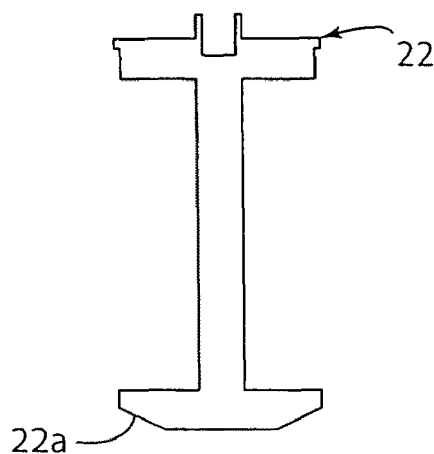
Figure 3D:
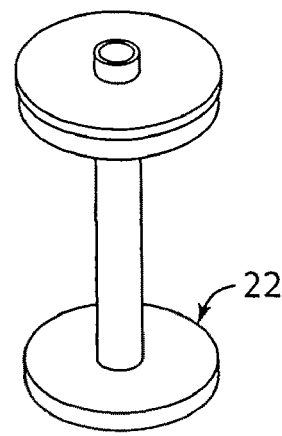
Figure 3B:
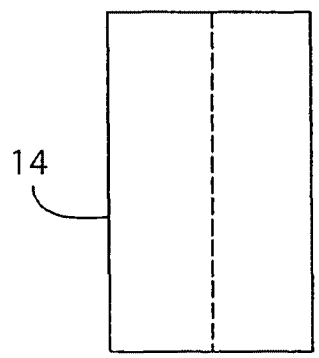
Figure 3F:
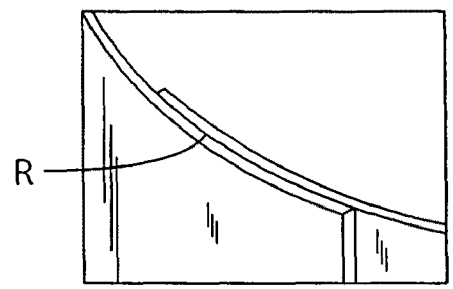
Figure 3C:
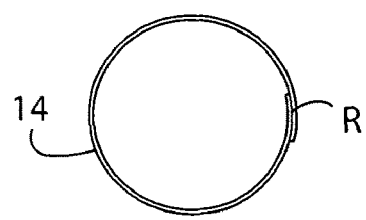
Figure 3E:
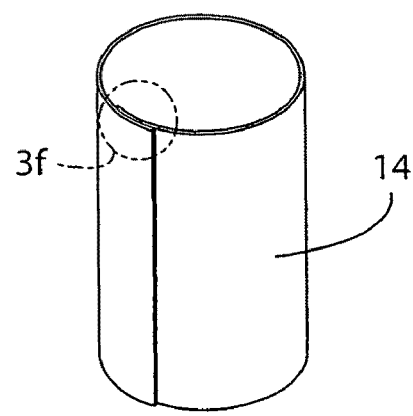
Figure 4A:
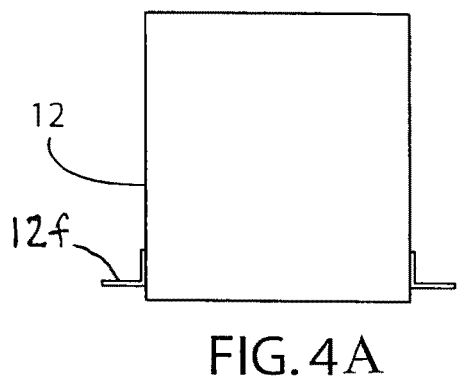
Figure 4D:
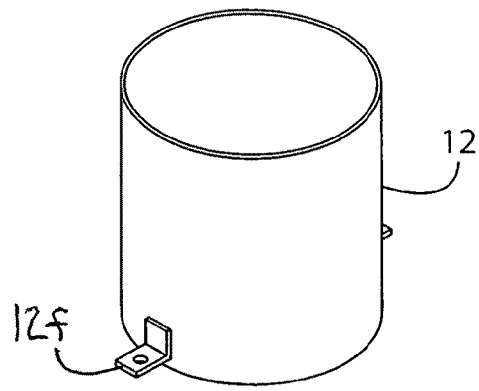
Figure 4B:
Figure 4C:
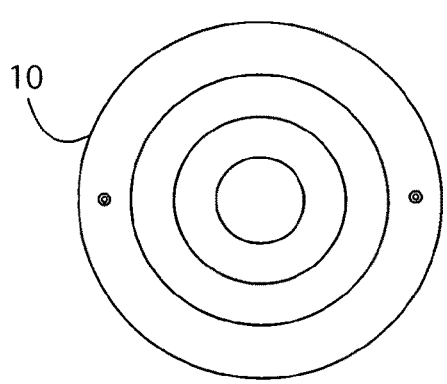
Figure 4E:
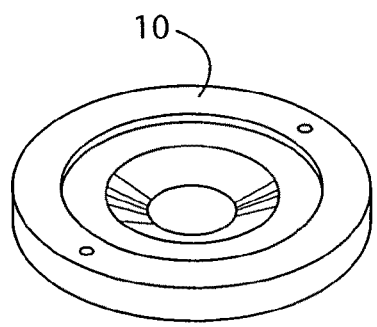

FIGS. 2A, 2B, and 2C show a sheared surface for the composite mixture including RCF (rock quarry crusher fines) filler particles and indicates that the filler particles are uniformity dispersed in the mixture and that the fiber reinforcement is breaking rather than pulling out indicating that the fiber tensile strength is fully mobilized and tightly bound to the matrix.

Plunger-Cast Pipe Manufacturing Method and Apparatus

Polymer mortar composite pipe specimens were manufactured from the aforementioned composite material mixtures for purposes of illustration and not limitation. Equipment used to produce the pipe specimens included: a hydraulic ram R, plunger piston 22, inner collapsible mold 14 having an overlapping region R at a longitudinal slit, outer mold 12 held on a base plate 10 by two bolts 11 securing outer mold flanges 12f on the base plate, and concrete or steel spacers BL to rest the base plate 10 on during cooling. The inner mold 14 has an outer diameter smaller than that of the outer mold 12 so as to define an annular space therebetween when the inner mold is inserted in the outer mold as described below. About 18,000 grams of material was used to produce one pipe specimen with dimensions of: wall thickness 38 mm; length 260 mm; outside diameter 306 mm.

Before the pipe is to be manufactured, the filler material and molds are preheated. The desired amount of filler is weighed out then placed into an oven (not shown) at approximately 270° C. Preheating the waste filler shortens the mixing time and decreases the moisture content. The plunger-cast base or bottom plate 10, outer cylinder mold 12, and inner cylinder collapsible mold 14 (see FIG. 3A-3F, FIG. 4A-4E, and FIG. 5A-5B) can be sprayed with a release agent, such as silicone spray, to ensure the pipe separates easily from the molds. The outer mold on the base plate and the inner mold are also preheated in the oven at 270° C.

Similar to the process for preparing composite material specimens for the aforementioned engineering property testing, post-consumer, waste PET is weighed to the desired amount then introduced into an electric melting pot (not shown). For the lab-scale testing described herein not all of the PET would fit into the electric melting pot for most of the mixes, so PET was added occasionally as it melted. The melted PET was mixed by hand using a metal stirring rod.

Pre-heated waste filler material is added to the melting PET. After placing waste filler material into the electric melting pot, the composite is stirred a few minutes and left to melt. The mixture is stirred every 15 to 30 minutes to increase melting and composite uniformity.

Once the composite has a uniform consistency, the desired amount of fiber reinforcement is incrementally added to the mixture. The addition of fibers increases viscosity and requires increased mixing effort.

To prepare the plunger-cast manufacturing system, the plunger piston 22 is attached to the hydraulic ram and centered as shown in FIG. 6. Once the composite mixture is ready, the inner collapsible cylinder mold 14 is taken out of the oven and attached at the top end to the plunger piston 22 with a hose clamp 24, FIG. 7. The bottom end of the inner mold 14 is held in place by hoop stresses that result from the plunger piston diameter being slightly larger than the inside diameter of the inner mold. The overlapping region R of the slit of the inner cylinder mold 14 is placed at the back of the piston 22.

After the inner cylinder mold 14 and the piston 22 are positioned, the outer cylinder mold 12 and base plate 10 are removed from the oven. The melted composite mixture is transferred into the outer mold 12 and base plate 10 by directly pouring from the melting pot into the outer mold on the base plate that are centered in position in the load frame for insertion of the inner mold 14 and plunger piston 22. About one third to one half of the outer mold is filled prior to inserting the plunger piston and inner mold. The plunger piston 22, with a special shaped beveled end 22a to force material outward, and inner mold 14 on the piston is then lowered slightly on hydraulic ram 30 and centered.

Figure 8:
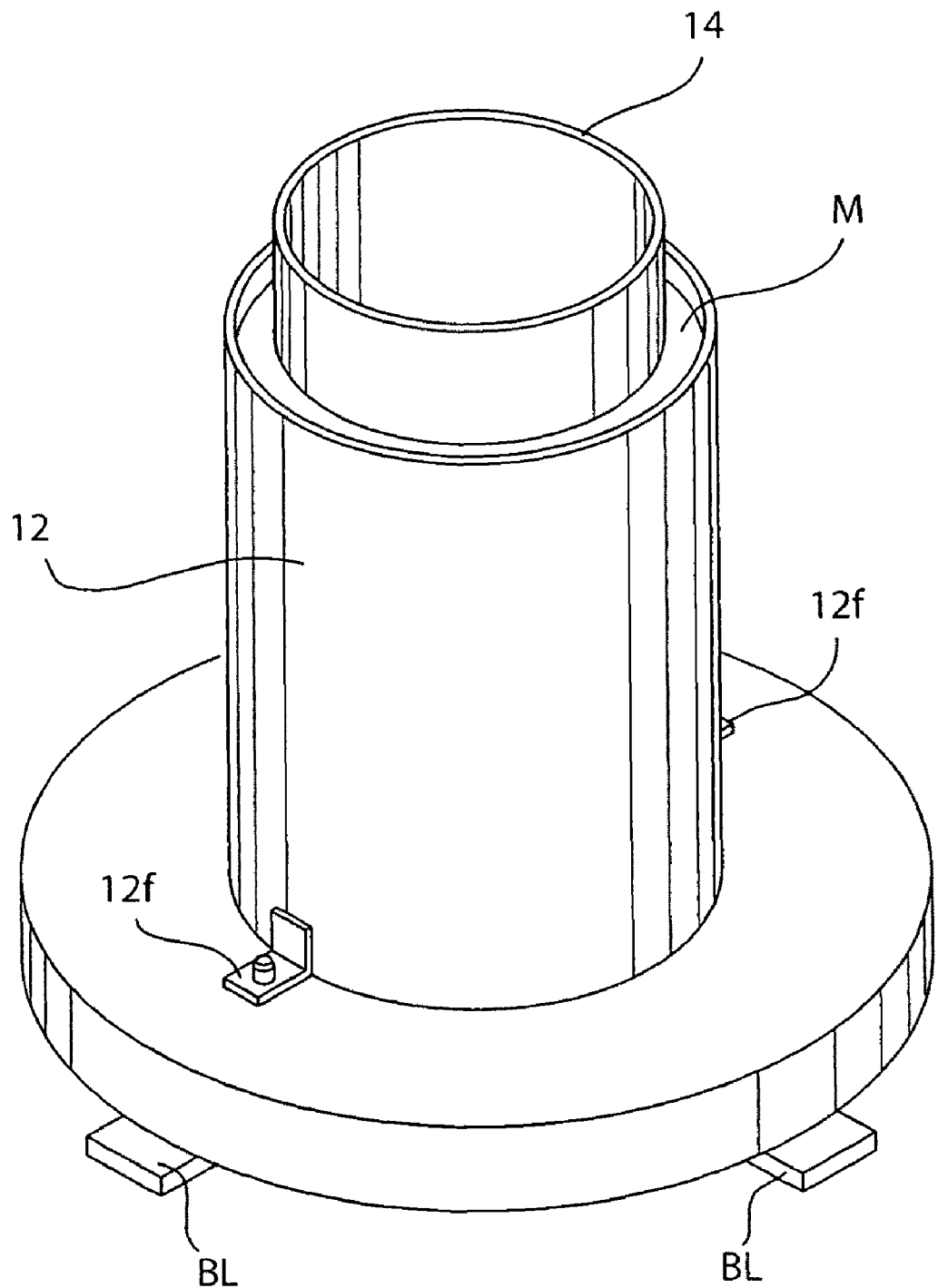
FIG. 8 is a perspective view of the plunger-cast mold after the plunger piston has been extracted

Once centered, the plunger piston and inner mold are lowered into the composite material with the hydraulic ram 30. As the plunger piston comes into contact with the composite material, the piston presses the composite material M outward between the inner and outer cylinder molds 12, 14. The pipe thickness is then equal to the distance between the molds 12, 14, in this example approximately 38 mm. Once the piston comes in contact with the base plate 10, the hose clamp 24 is loosened to detach the inner cylinder mold 14 from the piston 22. The plunger piston 22 is withdrawn and removed from the hydraulic ram 30, leaving the inner cylinder mold 14 in place as shown in FIG. 8.

Figure 9:
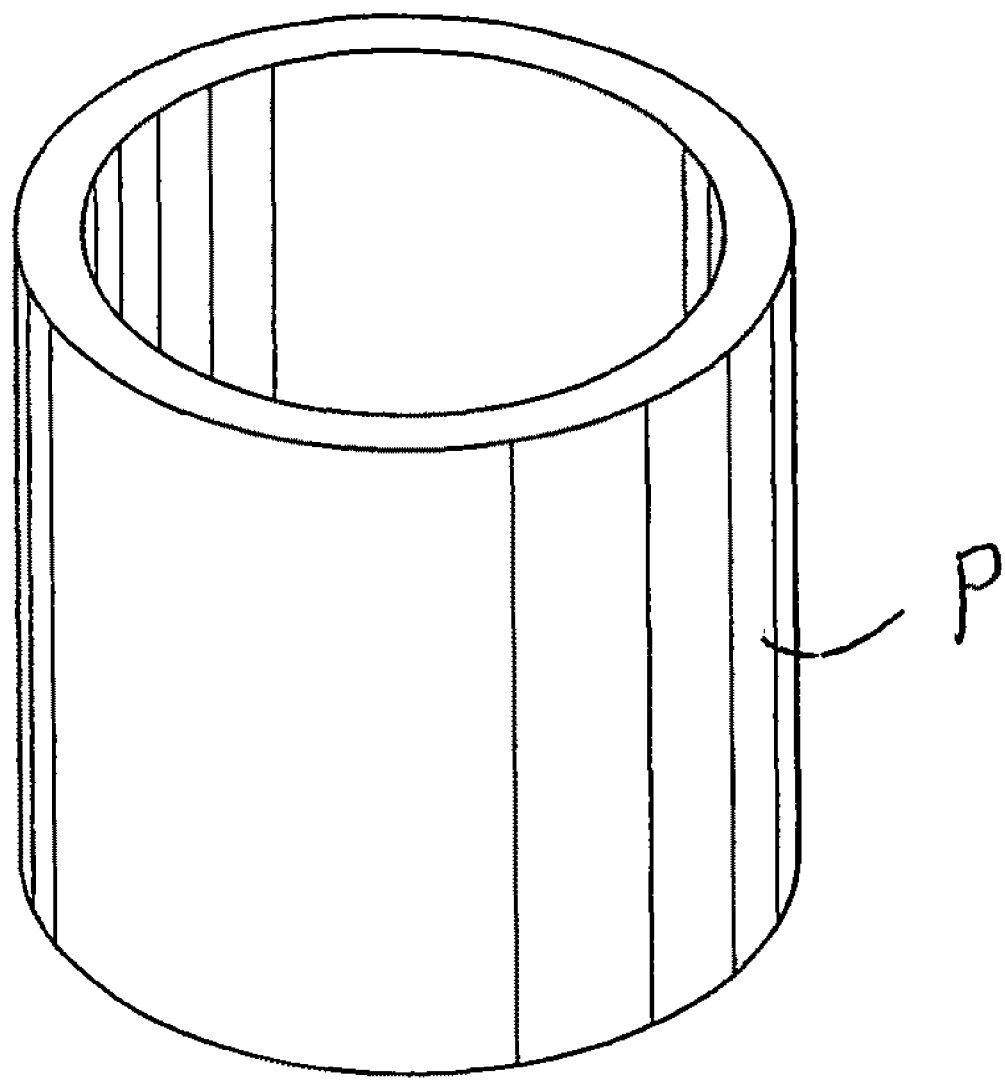
FIG. 9 is a perspective view of the plunger cast composite pipe specimen
Figure 11A:
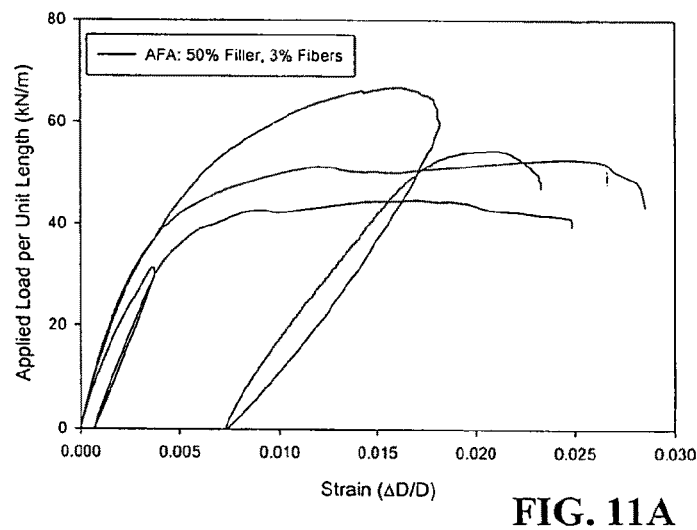
FIGS. 11A through 11J are graphs of applied load versus strain of the ultimate three-edge bearing strength tests.
Figure 11B:
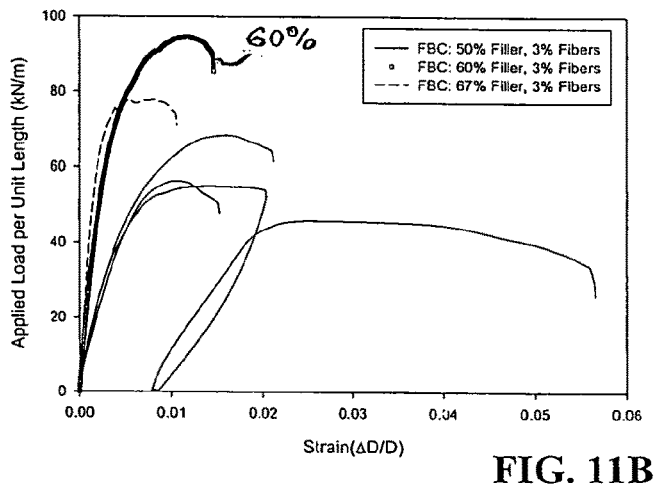
Figure 11C:
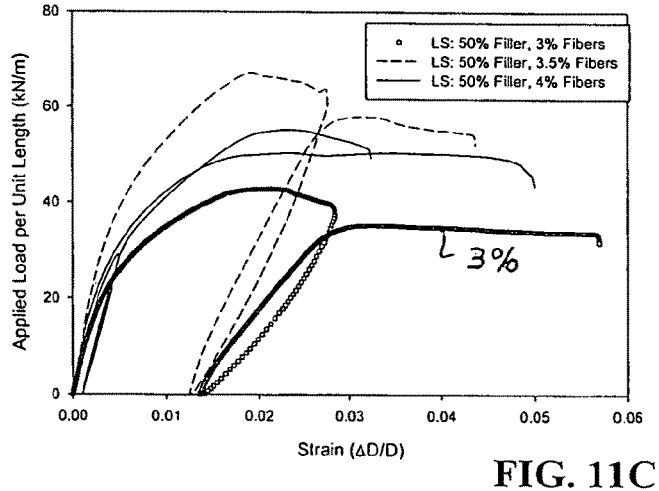
Figure 11D:
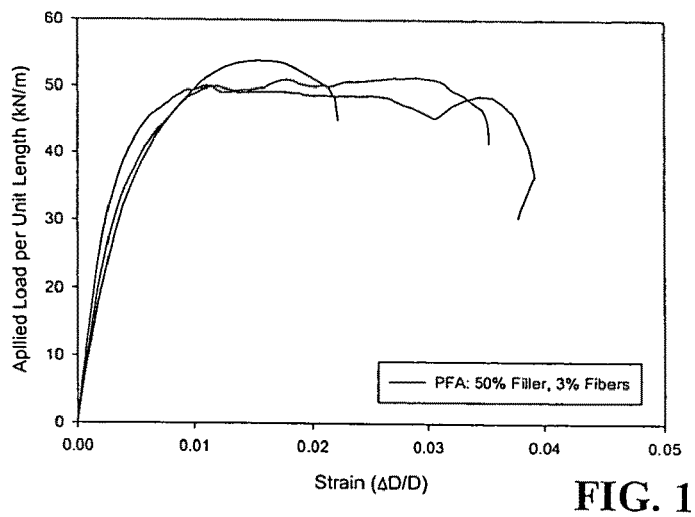
Figure 11E:
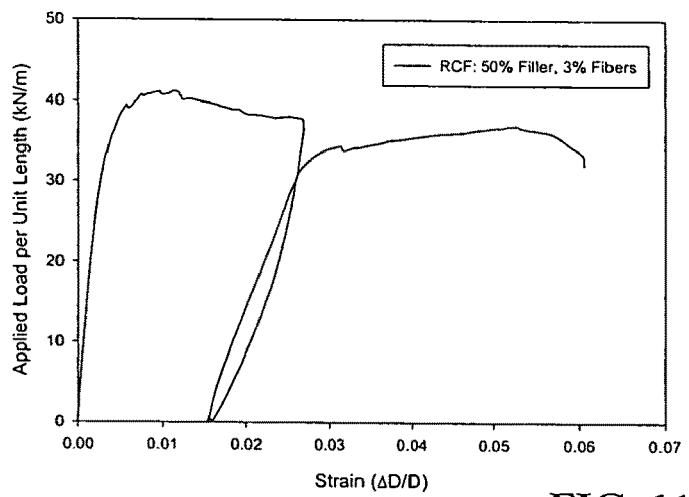
Figure 11F:
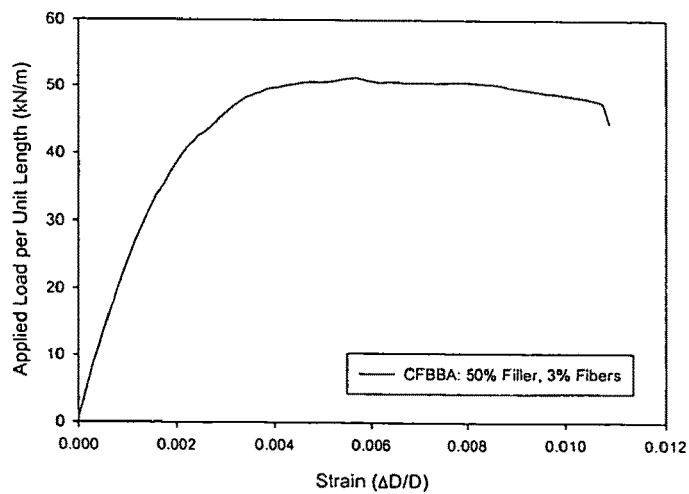
Figure 11G:
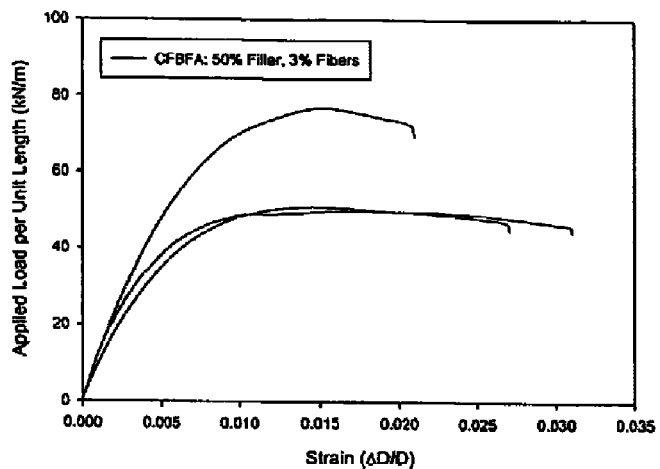
Figure 11H:
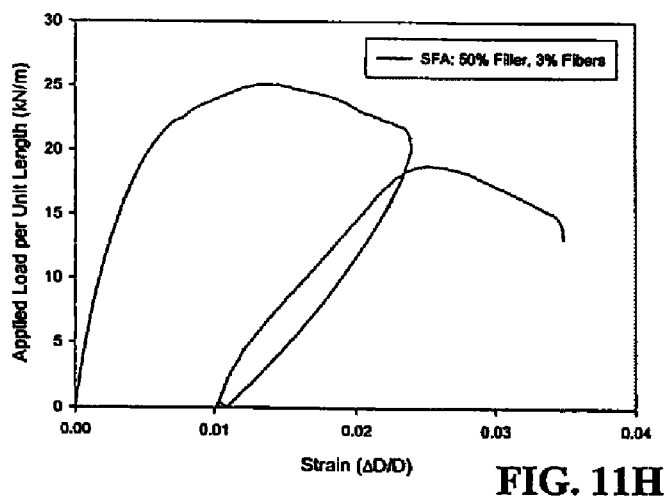
Figure 11I:
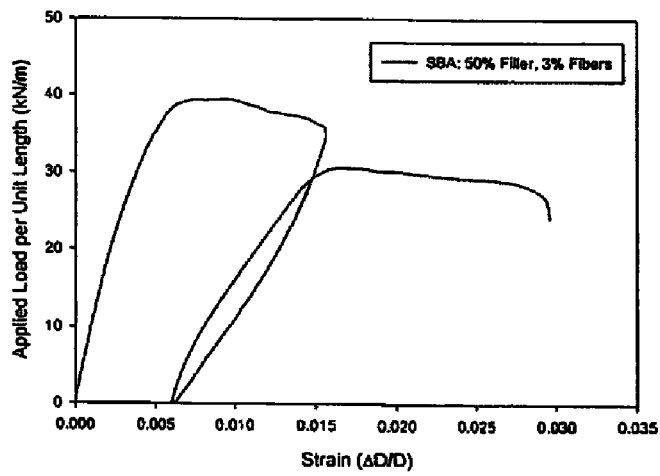
Figure 11J:
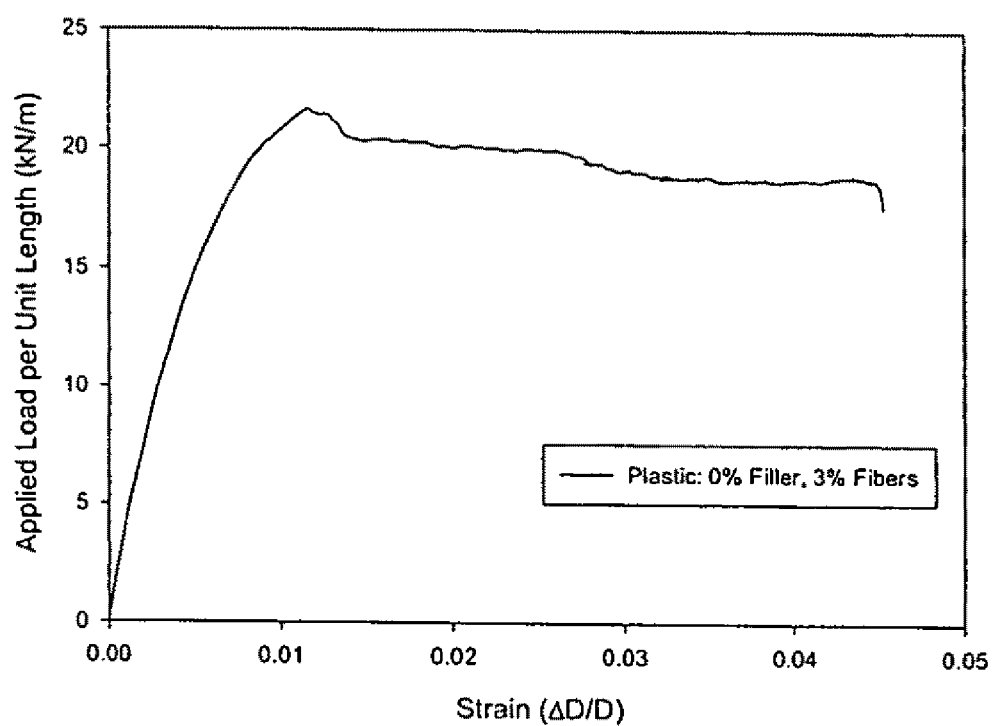

The final step of the plunger-cast manufacturing process is the cooling of the composite material. The molds 12, 14 on base plate 10 are placed on concrete or steel spacer blocks BL beneath the base plate 10 to promote uniform cooling. The inner cylinder mold diameter is reduced by tightening hose clamp 24 periodically. This is done to reduce development of residual stresses from thermodynamic shrinkage within the composite material. The pipe P formed by the composite material M and molds are allowed to cool at room temperature for about 30 minutes or until the composite material solidifies. The pipe P, FIG. 9, is then extracted from the outer and inner molds 12, 14 by further tightening the hose clamp 24 until the inner mold 14 is loose enough to slide out by hand and unbolting the outer mold 12 to allow it to be lifted off. The pipe P is then allowed to completely cool at room temperature. The above method and apparatus can be used to make a tubular body using a flowable material other than the composite material described in detail above.

Pipe Three-Point Load Test Results

ASTM C 497-98 Standard Test Method for Concrete Pipe, Manhole Sections, or Tile [reference 12] was used as a guide to test the tensile strength for the composite pipe specimens, FIG. 9. An MTS machine was used to produce the compressive force. Three-edge-bearing method of loading was used to test the ultimate 3-edge bearing strength of the pipe specimens.

Each pipe specimen was supported at the bottom by two parallel longitudinal bearing strips 40 and the load was applied through an upper longitudinal bearing strip 42 as shown in FIG. 10. The bearing strips were constructed from pinewood that was sound, free of knots, and straight and true from end to end. Each lower bearing wooden strip 40 had a cross-section of 50.8 mm, a height of 36 mm, and a length of 330 mm. Inside corners were rounded to a radius of 13 mm. The lower wooden bearing strips were fastened to a rigid wooden base 41 with Elmer's wood glue. The lower wooden bearing strips 40 were spaced apart the minimum distance of 25.4 mm. The rigid wooden base 41 was constructed from oak and is 171 mm wide, 61 mm high and 330 mm long. The upper wooden bearing strip 42 was glued to a steel I-beam B with liquid adhesive. The steel I-beam had a width of 50.8 mm, a height of 77 mm, and a length of 330 mm.

Vertical displacement during loading was determined using a direct current displacement transducer (DCDT) 47 as shown in FIG. 10. A carriage device (upper wooden base) 49 made from wood was machined to hold the DCDT to enable measurements of vertical displacement. A wooden base 43 was rounded on the bottom to fit the inner radius of the pipe specimen. A threaded steel rod 45 was screwed into the top of the wooden base 43 to hold the DCDT. The DCDT was secured to the threaded steel rod 45 using two zip ties. The top of the DCDT rested in a small hole in the upper wooden base 49. The top of the upper base was also rounded to fit the inner diameter of the pipe specimens.

The rigid wooden base 43 was centered under the loading ram R. A pipe specimen was then placed on its side on the lower wooden bearing strips 40 so that it was centered longitudinally and rested firmly. Next the steel I-beam B was placed on top of the pipe specimen with the wooden strip 42 touching the pipe specimen. The ram was lowered so that it touched the steel I-beam B. The lower bearing strips 40, upper bearing strip 42, and pipe specimen were then centered. The DCDT was then placed into the center of the pipe specimen and centered.

After zeroing the MTS machine the pipe specimens were then loaded. Loading rate was variable, but did not exceed 30 kN/linear meter throughout the duration of the test. Load and displacement were both recorded two times per second. Test was terminated after the maximum load decreased 200 pounds. Some pipe specimens were loaded, unloaded, and loaded again until failure occurred. As mentioned, FIG. 10 shows the MTS machine and the 3-edge bearing test setup.

Ultimate three-edge bearing strength results of the 26 pipe specimens tested are shown in FIGS. 11A through 11J and summarized in Table 5.

Pipe specimens with a 230 mm inside diameter and a 38 mm wall thickness were produced from composite materials. Loads to produce ultimate bearing strength, ranged from 21.7 to 94.7 N/m/mm where ultimate bearing strength is the maximum applied load divided by the length of the pipe. Average ultimate bearing strength (D-load) for the 26 pipe specimens was 53.2 N/m. Although no ASTM ultimate D-load specification exists for pipes with a 230 mm inside diameters, there are requirements for diameters ranging from 200 to 250 mm. Twenty-three of the 26 pipe specimens exhibited greater ultimate bearing strength than are required by ASTM for the 200 and 250 mm diameter vitrified extra strength clay pipes and all classes of non-reinforced concrete pipes.

Waste filler materials increase the ultimate bearing strength. The type of filler material used also affects the ultimate bearing strength. An analysis of PET to filler ratio was conducted utilizing FBC, keeping all other design mix variables constant and indicate increasing PET to filler ratio increases the ultimate bearing strength. Optimum PET to filler ratio for FBC was 40/60. A higher PET to filler ratio at 33/67 resulted in a lower ultimate bearing strength. Even higher filler contents were attempted, but the PET was not able to completely coat the filler material.

An analysis of the influence of fiberglass content was conducted utilizing LS as filler material. Percentage of fibers varied from 3 to 4 percent (by weight of PET and waste filler), keeping all other design mix variables constant. The optimum fiberglass content is about 3.5 percent for this mixture.

Ultimate bearing strength tests were also conducted to determine whether the PET material (Type 1, 2 or 3) would influence the strength. Results indicate that all forms of PET are similar in ultimate bearing strength for AFA mixture, with "Type 2" being the strongest. The impurities in the unsorted, unwashed waste PET, therefore, do not adversely affect the strength of the composite.

REFERENCES

[1] Basta, N., Ondrey, G., Rajagopal, R., and Kamiya, T. (1997). "Plastics recyclers scramble for scraps." *Chemical Engineering* 104(6), 43-119.

[2] Gabriele, M. C. (1997). "PET finds growing use in non-food containers." Modern Plastics, 60-65.

[3] U.S. EPA (1997). Characterization of municipal solid waste in the United States: 1996 Update, EPA 530-R-97-015.

[4] The 1980 United States Census.

[5] Needs Survey Report to Congress, Office of Water, EPA 430/09-91-024, Washington, D.C.

[6] The Aggregate Handbook. National Stone Association, Washington, D.C.

[7] US DOT, (1995). Fly ash facts for engineers, FHWA-SA-94-081.

[8] American Society for Testing and Materials. "Standard Test Methods for Compressive Strength of Cylindrical Concrete Specimens," ASTM C 39M-99, Annual Book of ASTM Standards, Volume 4.05, Philadelphia, 2000: 18-22.

[9] American Society for Testing and Materials. "Standard Test Methods for Splitting Tensile Strength of Cylindrical Concrete Specimens," ASTM C 496-96, Annual Book of ASTM Standards, Volume 4.05, Philadelphia, 2000: 268-271.

[10] American Society for Testing and Materials. "Standard Test Methods for Water Absorption of Plastics," ASTM D 570-98, Annual Book of ASTM Standards, Volume 8.01, Philadelphia, 2000: 32-35.

[11] American Society for Testing and Materials. "Standard Practices for Evaluating the Resistance of Plastics to Chemical Reagents," ASTM D 543-95, Annual Book of ASTM Standards, Volume 8.01, Philadelphia, 2000: 25-31.

[12] American Society for Testing and Materials. "Standard Test Methods for Concrete Pipe, Manhole Sections, or Tile [Metric]," ASTM C 497M-98, Annual Book of ASTM Standards, Volume 4.05, Philadelphia, 2000: 317-325.

TABLE 1

Chemical analyses and Physical Properties of Waste Filler Material

| Property | CFBFA | CFBBA | SFA | SBA | AFA | PFA | FBC | LS | RCF |
|---|---|---|---|---|---|---|---|---|---|
| (a) Chemical Composition | | | | | | | | | |
| Silicon Dioxide ($SiO_2$) | 27.80 | 7.50 | 25.80 | 50.70 | 35.05 | 36.97 | 14.91 | 0.25 | —* |
| Aluminum Oxide ($Al_2O_3$) | 12.70 | 3.00 | 12.20 | 23.90 | 16.62 | 19.95 | 8.21 | 0.12 | — |
| Ferric Oxide ($Fe_2O_3$) | 9.00 | 1.48 | 10.70 | 8.60 | 6.33 | 5.86 | 4.06 | 0.30 | — |
| Sulfur Trioxide ($SO_3$) | 12.50 | 30.70 | 0.51 | 0.44 | 2.89 | 2.00 | 29.23 | 0.07 | — |
| Calcium Oxide (CaO) | 24.30 | 52.60 | 1.30 | 3.01 | 26.65 | 22.83 | 37.97 | 54.77 | — |
| Magnesium Oxide (MgO) | 0.58 | 0.33 | 0.65 | 0.91 | 5.67 | 4.28 | 0.64 | 1.27 | — |
| Phosphorous Pentoxide ($P_2O_5$) | 0.30 | 0.07 | 1.14 | 0.14 | 2.26 | 1.65 | 0.39 | — | — |
| Potassium Oxide ($K_2O$) | 1.36 | 0.29 | 2.64 | 2.53 | 0.37 | 0.53 | 0.69 | — | — |
| Soduim Oxide ($Na_2O$) | 0.12 | 0.06 | 0.50 | 0.29 | 1.19 | 1.38 | 0.07 | — | — |
| Titanium Oxide ($TiO_2$) | 0.63 | 0.19 | 0.86 | 1.24 | 1.60 | 1.56 | 0.47 | — | — |
| Strontium Oxide (SrO) | 0.04 | 0.03 | 0.04 | 0.05 | 0.32 | 0.40 | 0.04 | 0.07 | — |
| Barium Oxide (BaO) | 0.02 | 0.00 | 0.01 | 0.01 | 0.76 | 0.78 | — | — | — |
| LOI (Loss On Ignition) | 10.40 | 3.60 | 42.40 | 7.99 | 0.29 | 1.80 | 2.9 | 43.00 | — |
| Total | 99.75 | 87.87 | 98.75 | 99.81 | 100.00 | 100.00 | 99.81 | 100.00 | — |
| (b) Physical properties | | | | | | | | | |
| Specific Gravity | 3.06 | 3.04 | 2.43 | 2.42 | 2.96 | 2.68 | 2.79 | 2.62 | 2.66 |
| Percent smaller than: | | | | | | | | | |
| 4.750 mm | 100 | 99 | 100 | 100 | 100 | 100 | 100 | 100 | 100 |
| 2.000 mm | 100 | 92 | 100 | 99 | 100 | 100 | 100 | 100 | 100 |
| 0.425 mm | 100 | 82 | 98 | 69 | 99 | 99 | 99 | 98 | 100 |
| 0.075 mm | 89 | 1 | 93 | 28 | 96 | 93 | 62 | 95 | 74 |

*Note: Data not available

TABLE 2

Composite Material Mixtures and Engineering Properties

| Filler Type | Plastic to Filler Ratio (based on dry weight) | Percent Fiberglass (weight %) | Length of Fiberglass (mm) | Average** Density (g/cm³) | Average Compressive Strength (MPa) | Average Tensile Strength (Mpa) | Average Elastic Modulus (MPa) |
|---|---|---|---|---|---|---|---|
| AFA | 50/50 | 3 | 13 | 1.58 | 31.6 | 2.06 | 3247 |
| FBC | 50/50 | 3 | 13 | 1.63 | 54.1 | 5.48 | 4108 |
| PFA | 50/50 | 0 | — | 1.66 | 28.3 | 1.78 | 3196 |
| PFA | 50/50 | 3 | 13 | 1.65 | 35.0 | 2.82 | 3394 |
| PFA | 45/55 | 3 | 13 | 1.69 | 42.5 | 4.00 | 3286 |
| PFA | 40/60 | 3 | 13 | 1.76 | 45.0 | 4.34 | 4043 |
| PFA | 35/65 | 3 | 13 | 1.83 | 65.4 | 6.83 | 5656 |
| PFA | 50/50 | 1 | 13 | 1.66 | 38.0 | 2.29 | 3216 |
| PFA | 50/50 | 2 | 13 | 1.67 | 50.1 | 2.97 | 4250 |
| PFA | 50/50 | 4 | 13 | 1.65 | 55.2 | 3.10 | 4605 |
| CFBFA | 50/50 | 3 | 13 | 1.65 | 58.8 | 8.60 | 5070 |
| SBA | 50/50 | 3 | 13 | 1.57 | 42.1 | 4.00 | 4102 |
| PFA | 50/50 | 3 | 6 | 1.67 | 38.1 | 3.23 | 2968 |
| PFA | 50/50 | 4 | 6 | 1.66 | 34.1 | 2.53 | 2337 |
| PFA | 50/50 | 5 | 6 | 1.65 | 37.9 | 3.12 | 2730 |
| PFA | 50/50 | 6 | 6 | 1.66 | 35.5 | 3.98 | 3504 |
| —* | 100/0 | 3 | 13 | 1.21 | 23.0 | 2.82 | 1612 |
| LS | 50/50 | 3 | 13 | 1.33 | 11.6 | 2.00 | 1264 |
| CFBBA | 50/50 | 3 | 13 | 1.60 | 23.4 | 7.93 | 1790 |
| CFBBA | 50/50 | 3 | 13 | 1.64 | 26.4 | 7.95 | 1334 |
| CFBBA | 50/50 | 3 | 13 | 1.66 | 30.7 | 6.61 | 2556 |
| RCF | 50/50 | 3 | 13 | 1.63 | 49.6 | 6.99 | 4364 |

*Note: Indicates not required.
**Note: Indicates average of four samples each for density, compressive strength, tensile strength and two samples for elastic modulus.

TABLE 3

Water absorption results

| Filler Type | PET to Filler Ratio | Type of PET Processing | Fibers Reinforcement (%) | Water Absorbed (%) | Δ (%) |
|---|---|---|---|---|---|
| PFA | 50/50 | 1 | 3 | 4.62 | 0.17 |
| FBC | 50/50 | 1 | 3 | 8.58 | 4.13 |
| AFA | 50/50 | 1 | 3 | 4.48 | 0.03 |
| AFA | 45/55 | 1 | 3 | 4.04 | −0.42 |
| AFA | 40/60 | 1 | 3 | 3.99 | −0.46 |
| AFA | 35/65 | 1 | 3 | 5.76 | 1.30 |
| AFA | 50/50 | 1 | 1 | 3.79 | −0.66 |
| AFA | 50/50 | 1 | 2 | 4.40 | −0.05 |
| AFA | 50/50 | 1 | 3 | 5.05 | 0.60 |
| CFBFA | 50/50 | 1 | 3 | 10.65 | 6.20 |
| SBA | 50/50 | 1 | 3 | 5.26 | 0.81 |
| AFA | 50/50 | 1 | 3 | 3.74 | −0.71 |
| AFA | 50/50 | 1 | 4 | 3.56 | −0.89 |
| ewdrfAFA | 50/50 | 1 | 5 | 3.90 | −0.55 |
| AFA | 50/50 | 1 | 6 | 4.09 | −0.36 |
| AFA | 50/50 | 2 | 3 | 4.68 | 0.22 |
| AFA | 50/50 | 3 | 3 | 4.07 | −0.38 |
| Plastic PET | 100/0 | 1 | 3 | 4.45 | 0.00 |
| LS | 50/50 | 1 | 3 | 7.17 | 2.72 |
| CFBBA | 50/50 | 1 | 3 | 11.76 | 7.31 |
| CFBBA | 50/50 | 1 | 3 | 12.19 | 7.73 |
| CFBBA | 50/50 | 1 | 3 | 12.36 | 7.91 |
| RCF | 50/50 | 1 | 3 | 1.80 | −2.66 |

TABLE 4

Summary of sulfuric acid test results

| Filler Type* | Weight (g) | Thickness (mm) | Diameter 1 (mm) | Diameter 2 (mm) | Comments |
|---|---|---|---|---|---|
| PFA | | | | | Specimen was destroyed during the fifth week of testing |
| FBA | | | | | Specimen was destroyed during the third week of testing |
| PFA | 0.73 | 0.03 | 0.94 | 0.64 | sides starting to crack |
| AFA | | | | | Specimen was destroyed during the fifth week of testing |
| AFA | | | | | Specimen was destroyed during the third week of testing |
| AFA | | | | | Specimen was destroyed during the fifth week of testing |
| AFA | | | | | Specimen was destroyed during the fifth week of testing |
| AFA | | | | | Specimen was destroyed during the fifth week of testing |
| AFA | 0.04 | 0.76 | 1.91 | 2.36 | pieces fell off while drying |
| AFA | | | | | Specimen was destroyed during the fifth week of testing |
| CFBFA | | | | | Specimen was destroyed during the fifth week of testing |
| SBA | 0.84 | 0.03 | 0.46 | 0.89 | slight crack |
| AFA | | | | | Specimen was destroyed during the first week of testing |
| AFA | | | | | Specimen was destroyed during the fifth week of testing |
| AFA | | | | | Specimen was destroyed during the fifth week of testing |

TABLE 4-continued

Summary of sulfuric acid test results

| Filler Type* | Weight (g) | Thickness (mm) | Diameter 1 (mm) | Diameter 2 (mm) | Comments |
|---|---|---|---|---|---|
| AFA | | | | | Specimen was destroyed during the fifth week of testing |
| AFA | | | | | Specimen was destroyed during the fifth week of testing |
| AFA | 2.15 | 0.43 | 1.85 | 2.64 | starting to crack |
| Plastic-PET | 0.20 | 0.05 | 0.36 | 0.48 | |
| LS | | | | | Specimen was destroyed during the fifth week of testing |
| CFBBA | | | | | Specimen was destroyed during the first week of testing |
| CFBBA | | | | | Specimen was destroyed during the first week of testing |
| CFBBA | | | | | Specimen was destroyed during the first week of testing |
| RCF | 0.23 | −0.18 | 0.15 | 0.36 | looks the best |

*Note: Mix design information is provided in Table 3.

TABLE 5

Pipe specimen mixture and ultimate three-edge bearing strengths

| Filler Type | Plastic to Filler Ratio (based on dry weight) | Percent Fiberglass (weight %) | Ultimate Three-Edge Bearing Strength (kN/m) | Strain, $\epsilon_d$ ($\Delta D/D$) at Ultimate Strength (%) | Initial Stiffness (kN/m/$\epsilon_d$) | Unload-Reload Stiffness (kN/m/$\epsilon_d$) |
|---|---|---|---|---|---|---|
| PFA | 50/50 | 3 | 66.9 | 1.6 | 12090 | 5260 |
| PFA | 50/50 | 3 | 44.7 | 1.7 | 13120 | 12500 |
| PFA | 50/50 | 3 | 52.8 | 2.5 | 12580 | —* |
| FBC | 50/50 | 3 | 56.2 | 1.0 | 10540 | — |
| FBC | 50/50 | 3 | 54.9 | 1.4 | 12010 | 4080 |
| FBC | 50/50 | 3 | 68.3 | 1.6 | 11940 | — |
| FBC | 40/60 | 3 | 94.7 | 1.2 | 23420 | — |
| FBC | 33/67 | 3 | 77.8 | 0.6 | 29950 | — |
| LS | 50/50 | 3 | 42.9 | 2.1 | 7240 | 2350 |
| LS | 50/50 | 3.5 | 67.2 | 1.9 | 10540 | 4010 |
| LS | 50/50 | 4 | 50.5 | 2.4 | 9020 | — |
| LS | 50/50 | 4 | 55.1 | 2.4 | 7840 | 7720 |
| PFA | 50/50 | 3 | 54.0 | 1.3 | 9730 | — |
| PFA | 50/50 | 3 | 51.4 | 2.9 | 11030 | — |
| PFA | 50/50 | 4 | 50.2 | 1.1 | 13140 | 2940 |
| RCF | 50/50 | 5 | 41.3 | 1.2 | 12500 | — |
| CFBFA | 50/50 | 6 | 51.3 | 0.6 | 19170 | — |
| CFBBA | 50/50 | 3 | 76.8 | 1.5 | 11490 | — |
| CFBBA | 50/50 | 3 | 50.8 | 1.5 | 8940 | — |
| CFBBA | 50/50 | 3 | 49.7 | 1.6 | 10700 | — |
| SFA | 50/50 | 3 | 25.1 | 1.4 | 5570 | 1330 |
| SBA | 50/50 | 3 | 39.5 | 0.7 | 9410 | 3330 |
| Plastic PET | 100/0 | 3 | 21.7 | 1.2 | 3680 | — |

*Note: Indicates reload test not performed

Although the invention has been described above with respect to certain embodiments, those skilled in the art will appreciate that the invention is not limited to these embodiment and that changes, modifications and the like can be made within the scope of the invention as set forth in the following claims.

I claim:

1. A method of making a tubular pipe body, comprising introducing a flowable material in an outer mold, disposing an inner collapsible mold on a plunger piston, said inner collapsible mold having a smaller transverse dimension than the outer mold, relatively moving the inner collapsible mold on the plunger piston and the outer mold with the material therein to cause the material to flow into a space between the outer mold and the inner mold such that it can form a tubular pipe body in said space between the outer mold and the inner collapsible mold, removing the plunger piston to leave the inner collapsible mold in place, and forming the tubular pipe body from the material in said space.

2. The method of claim 1 wherein the flowable material comprises a melted composite material comprising melted waste, chemically unmodified PET material; one or more waste solid filler materials, and solid fiber reinforcement.

3. The method of claim 1 further including preheating the outer mold and inner collapsible mold before the material is introduced.

4. The method of claim 1 including collapsing the inner collapsible mold in a manner to reduce its transverse dimension and allow its removal from the tubular pipe body.

5. The method of claim 4 including removing the outer mold and the inner collapsible mold from the tubular pipe body.

* * * * *

UNITED STATES PATENT AND TRADEMARK OFFICE
CERTIFICATE OF CORRECTION

| | | |
|---|---|---|
| PATENT NO. | : 8,043,548 B2 | |
| APPLICATION NO. | : 12/657681 | |
| DATED | : October 25, 2011 | |
| INVENTOR(S) | : David J. White | |

It is certified that error appears in the above-identified patent and that said Letters Patent is hereby corrected as shown below:

Column 16, Claim 2, line 54; replace ";" with -- , --.

Signed and Sealed this
Thirteenth Day of December, 2011

David J. Kappos
*Director of the United States Patent and Trademark Office*